March 3, 1959  E. R. PRICE  2,875,843
COMBINED HYDRAULIC SYSTEM FOR POWER STEERING AND POWER BRAKES
Filed June 5, 1957
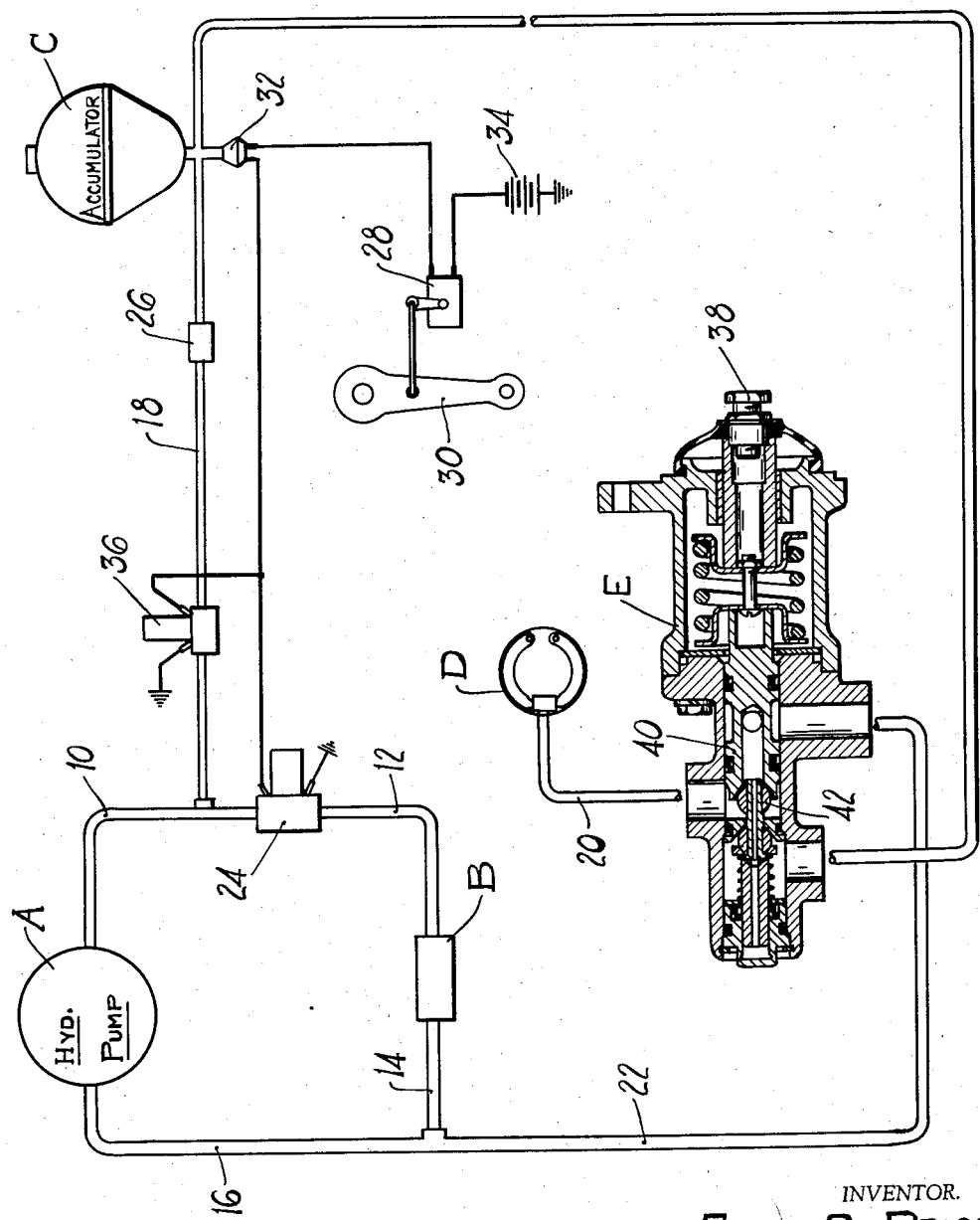
INVENTOR.
EARL R. PRICE
BY
William P. Hickey
ATTORNEY United States Patent Office 2,875,843
Patented Mar. 3, 1959

2,875,843

COMBINED HYDRAULIC SYSTEM FOR POWER STEERING AND POWER BRAKES

Earl R. Price, South Bend, Ind., assignor to Bendix Aviation Corporation, South Bend, Ind., a corporation of Delaware Application June 5, 1957, Serial No. 663,629

6 Claims. (Cl. 180—79.2)

The present invention relates to a combined automotive power steering and braking system and the like; and more particularly to a system of the above described type having a pressure accumulator for actuating the braking portion of the system, and means which will charge the accumulator only during those times when the power steering portion of the system is not in use.

An object of the present invention is the provision of a new and improved combined automotive hydraulic power braking and steering system which can utilize a pump having a capacity substantially no greater than that required to operate the power steering system alone, and an accumulator for supplying pressure to the braking portion of the system; which accumulator is charged with pressure only during those times when full power is not required of the steering system.

A further object of the invention is the provision of a new and improved hydraulic system having utility in systems other than a combined power steering and braking system which can be used to operate two fluid pressure motors from a single hydraulic pump sized substantially no greater than required to handle the continuous service of one of the fluid pressure motors.

A still further object of the invention is the provision of a new and improved system of the above described type employing a pump whose discharge pressure is substantially that required for operation of one of the fluid pressure motors; but which discharge pressure is considerably above that required to operate the other fluid pressure motor; and in which a first back pressure valve is placed in the branch circuit to said first motor and a second valve is placed in the branch circuit leading to the other fluid pressure motor, which second valve will be opened when the back pressure valve is closed, and will be closed when the back pressure valve is opened.

Another object of the invention is the provision of a new and improved combined power steering and braking system of the above described type in which the charging of the accumulator can only take place when the steering of the accumulator is substantially in its normal or neutral linkage system is substantially in its normal or neutral position occurring when the vehicle is in straight line motion.

The invention resides in certain constructions and combinations and arrangements of parts; and further objects and advantages will become apparent to those skilled in the art to which the invention relates from the following description of the preferred embodiment shown in the drawing.

Referring to the drawing there is diagrammatically shown therein a system for operating two fluid pressure motors from a single hydraulic pump having a capacity substantially no greater than is required to continuously operate one of the fluid pressure motors alone; and more specifically to a combined automotive hydraulic power steering and braking system in which the power steering mechanism is of the type used in automotive vehicles currently being produced. In an automotive braking system for passenger vehicles, the amount of pressure fluid required for each application of the vehicle brakes is in the range of approximately one cubic inch for each complete application. The quantity of fluid required for the operation of the power steering system, however, requires a much larger flow being in the neighborhood of approximately thirteen cubic inches per complete actuation. The pumps normally used for the supplying of hydraulic pressure for the power steering system are usually sized to provide a flow approximately that required for a continuous operation of the power steering system alone. In view of the fact that the power steering systems are hardly ever operated continuously, or are operated in a manner more nearly approaching intermittent operation, as for example occurs during a parking operation, there will be times when the full discharge of the pump is not required to operate the power steering system; and it is contemplated by the present invention to use these periods of time for the charging of an accumulator from which pressure can then be supplied to the power braking system. Were the power braking system to be operated directly from the power steering pump, not only would the speed of application of the two systems be endangered; but the pressure developed in one system would effect the pressures delivered to the other system so as to make the operation of each of the individual systems highly unsatisfactory. The combining of the power braking and power steering systems is made even more complicated where the power steering system utilizes an open center valve which normally creates no back pressure against the pump during the non-actuating condition of the steering. The degree of back pressure developed by the open center valve modulates with the amount of force required to be delivered to the power steering system. The control valve for the power braking system on the other hand is usually a closed center valve which completely shuts off flow from the pump during non-actuating periods, and only permits flow through its supply and exhaust system when the brakes are being actuated. The difficulties encountered in combining the two systems as set forth above are overcome by the arrangement shown in the drawing wherein satisfactory service is provided under all normal conditions for both the power steering system and for the power braking system. The solitary figure of the drawing is a diagrammatic view with parts in section of a hydraulic system for the actuation of both a hydraulic power actuated steering mechanism and an hydraulic power actuated braking mechanism of an automotive vehicle.

The system shown generally comprises a hydraulic pump A sized in the manner as set forth above, an open center control valve B for the fluid pressure motor operating the power steering system, an accumulator C for supplying pressure to the power braking system, brake applying wheel cylinders D for the vehicle, and a brake applying or control valve E operatively interpositioned in the system between the accumulator C and the wheel cylinder D. Pressure from the pump discharge passes through the discharge line 10 to a branch line 12 leading to the power steering valve B, and thence through the power steering return line 14 and common return line 16 to the suction of the hydraulic pump A which also may include a reservoir, not shown. Continuous flow normally exists through the above described system. Pressure fluid for operation of the braking system is supplied through a branch line 18 which is supplied by the pump discharge line 10 and which leads to the inlet port of the brake control valve E. The brake control valve E as previously described is a normally closed valve; and therefore, flow through the pressure supply line 18 for the power braking system only occurs when the vehicle brakes are being actuated. Control pressure from the brake control valve E is communicated to the brake applying wheel cylinders D by the control line 20; and exhaust from the control valve E is communicated with the pump suction by means of the exhaust line 22 and common return line 16.

Inasmuch as substantially no back pressure is normally created in the pump discharge by the power steering system, a pressure accumulator C is connected into the branch line 18 leading to the brake control valve E and a suitable back pressure valve 24 is positioned in the branch pressure supply line 12 for the power steering system upstream of its control valve B. During those periods of time when no back pressure is developed by the power steering valve B, a closing down on the back pressure valve 24 provides a restriction to flow therethrough, creating a back pressure with respect to the pump A capable of charging the accumulator C in the branch line leading to the power braking system. In order that pressure will be held in the accumulator C when the back pressure valve 24 is released or opened, suitable valve means must be supplied in the branch line 18 upstream of the accumulator C to prevent the back flow of stored pressure from returning to the power steering circuit when the back pressure valve 24 is again opened. The check valve 26 very adequately fulfills this function.

It will be apparent that the back pressure valve 24, even though it were not designed to completely close off all flow to the power steering system during its closed condition, should preferably not be moved into its closed condition when a full power actuation of the power steering system is required. To prevent the back pressure valve 24 from being closed under the above described condition, the system shown in the drawing provides control mechanism or switch 28 constructed and arranged to only permit the back pressure valve 24 to be closed when the steering system is in a center or neutral position, as occurs when the vehicle is in straight line motion. The preferred arrangement shown in the drawing utilizes a solenoid operated back pressure valve 24, and an electrical switch mechanism 28 constructed, arranged, and connected to the steering linkage 30 in such manner as to present a closed electrical circuit when the steering linkage 30 is within a few degrees of its normal or center position. The switch mechanism 28 will form an open electrical circuit when the steering linkage 30 is moved in either direction from its previously mentioned center position. In order that the accumulator C can be maintained within predetermined high and low pressure limits, a pressure sensitive switch 32 sensing the pressure in the accumulator C is inserted in the electrical circuit which includes the solenoid valve 24, switch 28, and battery 34. In the particular embodiment depicted in the drawing, the switch 32 will be closed at a hydraulic pressure below approximately 350 p. s. i. and will be opened when the pressure approaches approximately 450 p. s. i. pressure. The solenoid valve 24 is a normally open valve (spring biased open) such that it will only be closed to its back pressure developing condition when the steering linkage 30 is in its centered position and the accumulator pressure has dropped below approximately 350 p. s. i. When the steering linkage 30 is in its centering position and the accumulator has been charged to a pressure exceeding approximately 450 p. s. i., the switch 32 will open the circuit permitting the solenoid valve to again assume its open or non-back pressure creating condition. In those instances where it is not convenient to operate the switch 28 directly from the power steering linkages, other means may be utilized to sense when the power steering system is not being used, as for example a suitable pressure sensitive switch.

In those instances where considerably higher pressures are required to operate the power steering system than are required to operate the power braking system, pressures considerably above the 450 p. s. i. desired to be maintained in the accumulator C may be developed during operation of the power steering system; which of course would open the check valve 26 and charge the accumulator C with the maximum pressure which had been developed during the previous power steering application. This would make operation of the braking system quite unpredictable; and in those instances where this can occur, a second normally closed valve will preferably be included in the branch line 18 upstream of the accumulator C to valve off the branch line 18 from the power steering system whenever the power steering system is actuated. In the embodiment shown in the drawing, a normally closed solenoid valve 36 is inserted in the line 18 upstream of the check valve 26, and is operated by means of a branch electrical circuit in parallel with the solenoid of valve 24. With such an arrangement, the valve 36 will normally be closed when the back pressure valve 24 is opened; such that changes in pressure in the power steering system will not affect the pressure being maintained in the accumulator C; and such that the valve 36 will be opened whenever the solenoid valve 24 is closed to permit back pressure created by means of the valve 24 to be communicated with the accumulator C. It should be apparent that while the preferred embodiment may utilize the check valve 26 in conjunction with the solenoid 36, the system could still operate, although perhaps less satisfactorily, were the check valve 26 to be eliminated.

As previously described, the brake control valve E is a normally closed valve which in its normal condition valves off pressure in the supply line 18 from the line 20 while at the same time communicating the brake control line 20 with the exhaust line 22. When its control member 38 is depressed, its tbular flow conducting control member 40 abuts the ball 42 to close off communication of the line 20 with the exhaust line 22, and admits pressure from the line 18 into the control line 20. This brief explanation, in conjunction with the cross-sectional view of the valve shown in the drawing, will permit those skilled in the art to readily understood its functioning; and for a more complete understanding of its construction and operation, reference may be had to the H. E. Hruska Patent 2,752,947.

It will be apparent that the objects heretofore enumerated, as well as others, have been accomplished; and that there has been provided a new and improved hydraulic system particularly adaptable for use with combined hydraulic power braking and steering systems. While the invention has been described in considerable detail, I do not wish to be limited to the particular construction shown and described; and it is my intention to cover hereby all novel adaptations, modifications, and arrangements thereof which come within the practice of those skilled in the art to which the invention relates and which come within the scope of the following claims.

I claim:

1. In a combined power steering and braking system or the like, a hydraulic pump, a first hydraulic circuit through which fluid is normally circulated by said pump, an open center fluid pressure motor control valve in said hydraulic circuit, a first valve in said hydraulic circuit between the discharge of said pump and said control valve constructed and arranged to create a back pressure when closed, a second control valve in parallel branch hydraulic circuit with respect to said open center control valve and said first valve, a pressure accumulator connected to said parallel branch circuit on the upstream side of said second control valve, a third valve in said branch circuit upstream of said accumulator for preventing back flow from said parallel branch circuit to said open center control valve, a first control mechanism for sensing the pressure condition of said accumulator, a linkage having a normal position and which is caused to be actuated by said open center control valve when said open center control valve is actuated, a second control mechanism operated by said linkage, said first valve and said first and second control mechanisms being constructed and arranged to close said first valve only when said linkage is within a few degrees of its normal position, and the pressure in said accumulator falls below a predetermined pressure, whereby said second control valve can be operated by means of pressure from said accumulator and said accumulator can only be charged with pressure when the linkage is in its normal position.

2. In a combined power steering and braking system or the like, a hydraulic pump, an open center power steering valve in hydraulic circuit with said pump, a solenoid valve in said hydraulic circuit between the discharge of said pump and said power steering valve constructed and arranged to create a back pressure when closed, a brake control valve in parallel branch hydraulic circuit with respect to said power steering valve and said solenoid valve, a pressure accumulator connected to said parallel branch circuit on the upstream side of said brake control valve, a second valve in said branch circuit upstream of said accumulator for preventing back flow from said parallel branch circuit to said steering valve, a first pressure operated switch in said branch circuit, a vehicle steering linkage having a normal position for straight line vehicle motion, a second switch operated by said steering linkage, said second switch being constructed and arranged to be in one condition when said steering linkage is within a few degrees of its normal center position and to be placed in a second condition when moved in either direction from its center position, a source of electrical energy, and an electrical circuit connecting said solenoid valve, said switches and said source in series circuit in such manner that said first valve will only be closed when the pressure in said accumulator falls below a predetermined pressure, and said steering linkage is in its centered position, whereby said brake control valve can be operated by means of pressure from said accumulator and said accumulator can only be charged with pressure when the steering linkage is in its normal position.

3. In a combined power steering and braking system or the like, a hydraulic pump, an open center power steering valve in hydraulic circuit with said pump, a normally open solenoid valve in said hydraulic circuit between the discharge of said pump and said power steering valve constructed and arranged to create a back pressure when closed, a normally closed modulating brake control valve in parallel branch hydraulic circuit with respect to said power steering valve and said solenoid valve, a pressure accumulator connected to said parallel branch circuit on the upstream side of said brake control valve, a valve in said branch circuit upstream of said accumulator for preventing back flow from said parallel branch circuit to said steering valve, a normally closed pressure operated switch in said branch circuit downstream of said valve, said switch being constructed and arranged to be opened at pressures above a predetermined pressure, a vehicle steering linkage having a normal position for straight line vehicle motion, a normally closed switch operated by said steering linkage, said switch being constructed and arranged to be opened when said steering linkage is moved a few degrees in either direction from its normal position, a source of electrical energy, and an electrical circuit having said solenoid valve said switches and said source in series circuit, whereby said brake control valve can be operated by means of pressure from said accumulator and said accumulator will only be charged with pressure when the steering linkage is in its normal position.

4. In a combined power steering and braking system or the like, a hydraulic pump, a first open center control valve in hydraulic circuit with said pump, a first solenoid valve in said hydraulic circuit between the discharge of said pump and said valve constructed and arranged to create a back pressure when closed, a second normally closed control valve in parallel branch hydraulic circuit with respect to said first control valve and said solenoid valve, a pressure accumulator connected to said parallel branch circuit on the upstream side of said second control valve, a valve in said branch circuit upstream of said accumulator for preventing back flow from said parallel branch circuit to said steering valve, a second solenoid valve in said branch circuit upstream of said accumulator, a pressure operated switch in said branch circuit for sensing the pressure between said accumulator and said second control valve, a linkage having a normal position, a switch operated by said linkage, said switch being constructed and arranged to be in one condition when said linkage is within a few degrees of its normal position and to be placed in a second condition when moved in either direction from its normal position, a source of electrical energy, and an electrical circuit for energizing said solenoid valves, said electrical circuit having said switches and said source in series circuit with respect to said solenoid valves, whereby said second control valve can be operated by means of pressure from said accumulator and said accumulator can only be charged with pressure when the linkage is in its normal position.

5. In a combined power steering and braking system or the like, a hydraulic pump, an open center power steering valve in hydraulic circuit with said pump, a first normally open solenoid valve in said hydraulic circuit between the discharge of said pump and said power steering valve constructed and arranged to create a back pressure when closed, a normally closed modulating brake control valve in parallel branch hydraulic circuit with respect to said power steering valve and said solenoid valve, a pressure accumulator connected to said parallel branch circuit on the upstream side of said brake control valve, a check valve in said branch circuit upstream of said accumulator, a second normally closed solenoid valve in said branch circuit upstream of said accumulator, a normally closed pressure operated switch in said branch circuit for sensing the pressure between said accumulator and said brake control valve, said switch being constructed and arranged to be closed at pressures above a predetermined pressure, a vehicle steering linkage having a normal position for straight line vehicle motion, a normally closed switch operated by said steering linkage, said switch being constructed and arranged to be opened when said steering linkage is moved a few degrees in either direction from its normal position, a source of electrical energy, and an electrical circuit for energizing said solenoid valves, said electrical circuit having said switches and said source in series circuit with respect to said solenoid valves, whereby said brake control valve can be operated by means of pressure from said accumulator and said accumulator can only be charged with pressure when the steering linkage is in its normal position.

6. In a combined power steering and braking system or the like: a hydraulic pump, a first open center hydraulic circuit through which fluid is normally circulated by said pump, a driven force transmitting mechanism in one portion of the system, said mechanism having a normal position, an open center control valve in said first hydraulic circuit for causing said driven force transmitting member to be moved from its normal position when said control valve is moved out of its open center condition, a branch hydraulic circuit in parallel with respect to said open center control valve, a normally closed control valve in said branch circuit preventing flow through said branch circuit, an accumulator communicating with the portion of said branch circuit between said normally closed control valve and said pump, a first control mechanism which is in a first condition when the pressure in said accumulator is below a generally predetermined value and which is in a second condition when the pressure in said accumulator is above said generally predetermined value, a second control mechanism which is in a first condition when said force transmitting mechanism is in its normal position and which is in a second condition when said force transmitting mechansm is moved out of its normal position, and valve means controlled by said first and second control mechanisms, said valve means restricting flow to said open center valve to build up a back pressure to said branch circuit when both control mechanisms are in their first conditions and said valve means closing off said branch circuit from said open center circuit while permitting substantially unrestricted flow through said open center circuit when at least one of said control mechanisms is in its second condition.

References Cited in the file of this patent
UNITED STATES PATENTS

| | | |
|---|---|---|
| 2,363,179 | Harrington et al. | Nov. 21, 1944 |
| 2,559,065 | Dewandre | July 3, 1951 |
| 2,708,344 | Green | May 17, 1955 |
| 2,737,196 | Eames | Mar. 6, 1956 |
| 2,780,064 | Sharp et al. | Feb. 5, 1957 |